W. A. CHERRY, Jr.
ANCHOR FOR SAFETY BELTS.
APPLICATION FILED AUG. 17, 1911.
1,026,562.   Patented May 14, 1912.
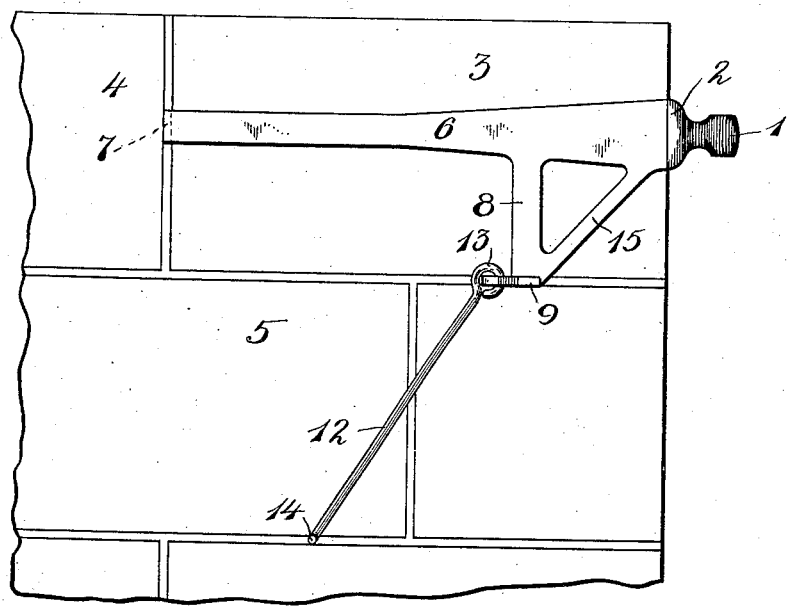
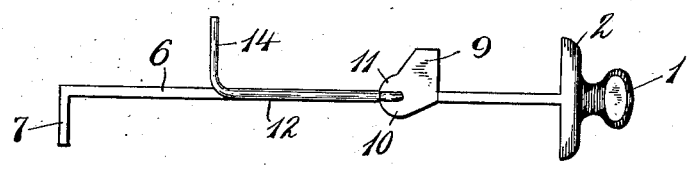
Witnesses:   Inventor
Chas. W. Beard   W. A. Cherry Jr.
Ralph C. Powell   By his Attorneys
COLUMBIA PLANOGRAPH CO., WASHINGTON, D. C.

UNITED STATES PATENT OFFICE.

WILLIAM A. CHERRY, JR., OF WHITE PLAINS, NEW YORK, ASSIGNOR TO CHERRY-DRISCOLL COMPANY, OF NEW YORK, N. Y., A CORPORATION OF NEW YORK.

ANCHOR FOR SAFETY-BELTS.

1,026,562.        Specification of Letters Patent.        Patented May 14, 1912.

Application filed August 17, 1911. Serial No. 644,704.

*To all whom it may concern:*

Be it known that I, WILLIAM A. CHERRY, Jr., a citizen of the United States, residing at White Plains, Westchester county, New York, have invented certain new and useful Improvements in Anchors for Safety-Belts, of which the following is a full, clear, and exact description.

My invention relates to improvements in anchors for safety belts such as are worn by window cleaners.

In the cleaning of windows in tall buildings it is customary for those employed in such hazardous work to be provided with a safety belt, the ends of which are attached to suitable anchoring devices such as screw-eyes, secured at the side of the window casing, so that in the event the window cleaner falls, he will be supported by the belt thus anchored. By reason of the importance of the duty performed by such anchoring devices, it is of obviously vital importance that such devices be made in the best possible manner, and secured in such a way as to prevent all possibility of accident.

To that end it is my aim to provide an anchor adapted for brick buildings, and which shall be so anchored in the brick work surrounding the window opening as to prevent all possibility of accidental detachment. Incidentally other advantages will be apparent to any one familiar with devices of this character from a reading of the following description and an examination of the accompanying drawings, in which I have shown my invention in the preferred form.

Figure 1 is a plan view representing one layer of brick with my anchoring device thereon. Fig. 2 is a bottom plan view of the anchoring device.

1 represents the head of the anchoring device, the same being preferably in the form of a capstan, as distinguished from an ordinary eye. It is around the narrow part of this capstan that a strong snap hook or terminal, such as safety belts are provided with, is secured. At the base of the shank is a broad flange 2, which extends up and down the face of the wall. The wall as shown is formed of brick, three bricks being indicated at 3, 4 and 5.

6 is the main arm of the anchor, which is flat and which preferably is widest at that end connected to the flanged anchor head 1. This main arm 2 is provided with an offset or hook 7 at its rear end. The overall length between the inner shoulder of the hook 7 and the inner shoulder of the flange 2 corresponds to the length of the brick employed, so that when in place the hook 7 will rest between the two bricks 3—4, which are arranged end to end.

8 is an arm extending laterally from the main arm 6. 9 is an offset or hook at the end of said arm. This hook extends preferably in a direction opposite to the direction of the hook 7.

10 is a hook or offset in the same plane as the hook 9, but below the arm 8. The hooks 9 and 10, when the anchoring device is in place, are arranged to stand between two bricks arranged side by side. 11 is a rearwardly directed perforated ear in the same plane with the hooks 9—10.

12 is a hook-like extension, which is preferably secured to the ear 11 by an eye 13, so that it may partake of a swinging or adjustable movement.

14 is the hooked end of the extension 12. This part 12 is preferably made from spring steel wire of sufficiently heavy gage to prevent bending, excepting under extraordinary strains greater than this particular device could be subjected to in this connection. The hooked end 14 is swung into the space to one side of the brick 5. When the parts are in this position, as indicated in Fig. 1, another layer of brick is applied with the usual cement. It will now be seen that when the cement is hardened, the anchoring device will be held rigidly by not less than three bricks, namely, the brick 3, the brick above the brick 5 and the brick directly above the brick 3.

15 is a brace extending diagonally from the end of the arm 8 to the base of the arm 6 adjacent to the flange 2.

It is obvious that the structure is reversible and may be applied to the brick work at either side of a window opening. It is also obvious that the arrangement is such that the lines of strain, in the event of emergency, are resisted in a most effective manner. It is also obvious that, inasmuch as the part 12 is hinged to the main body, its end may be conveniently adjusted to any position wherein it may be anchored between the brick, which is a feature of importance, because in some instances brick of irregular size may be employed, so far as the same are hidden from view. Another advantage in connecting the member 12 to the main body so that it may swing, is found in the fact that the devices may be more compactly packed and shipped, and there is materially less danger of breakage.

While I have shown my invention in its preferred form, I appreciate that various modifications may be made without departing from the spirit and scope of the invention.

What I claim is:

1. In an anchor for window cleaners' safety belts, an anchorage head having a flanged base, a flat arm extending rearwardly from said base and having a hook arranged transversely thereof at its rear end, another arm extending laterally from the first mentioned arm and having a hook at the end thereof transverse thereto and a brace running obliquely from the last mentioned arm to the base of the first mentioned arm near said flange.

2. In an anchor for window cleaners' safety belts, an anchorage head having a flanged base, a flat arm extending rearwardly from said base and having a hook arranged transversely thereof at its rear end, another arm extending laterally from the first mentioned arm and having a hook at the end thereof transverse thereto and a brace running obliquely from the last mentioned arm to the base of the first mentioned arm near said flange, said hooks aforesaid extending in opposite directions relatively to the plane of the arms and brace.

3. In an anchor for window cleaners' safety belts, an anchorage head having a flanged base, a flat arm extending rearwardly from said base and having a hook at its rear end, another arm extending laterally from the first mentioned arm and having a laterally extending hook at its end, a brace running obliquely from the last mentioned arm to the base of the first mentioned arm near said flange, and a swinging hook extension carried by the laterally extending arm.

4. In an anchor device for window cleaners' safety belts, an anchor head, a flange at the base thereof, a rearwardly extending arm having a hook, a space between said flange and said hook corresponding with the overall length of the brick, a laterally extending arm projecting from said first mentioned arm at a point intermediate its length, a hook at the end of the laterally extending arm arranged to overstand the edge of the same brick, a swinging extension having a hook end, said extension being connected to the laterally extending arm and of a length sufficient to overstand the edge of an adjacent brick and to stand in a line oblique to the line of the first mentioned arm, and a brace connecting the end of said laterally extending arm with the first mentioned arm near said flange and lying in substantially the same or a parallel line with the swinging hooked extension.

WILLIAM A. CHERRY, Jr.

Witnesses:
 ELLA C. CHERRY,
 WILLIAM A. CHERRY.

---

Copies of this patent may be obtained for five cents each, by addressing the "Commissioner of Patents, Washington. D. C."